(12) United States Patent
Bodén

(10) Patent No.: US 7,856,182 B2
(45) Date of Patent: Dec. 21, 2010

(54) OPTICAL CWDM-SYSTEM

(75) Inventor: Lars Bodén, Bromma (SE)

(73) Assignee: Transmode Systems AB, Stockholm (SE)

( * ) Notice: Subject to any disclaimer, the term of this patent is extended or adjusted under 35 U.S.C. 154(b) by 442 days.

(21) Appl. No.: 10/128,404

(22) Filed: Apr. 23, 2002

(65) Prior Publication Data

US 2002/0163687 A1 Nov. 7, 2002

(30) Foreign Application Priority Data

Apr. 23, 2001 (SE) .................................. 0101416

(51) Int. Cl.
*H04B 10/00* (2006.01)
(52) U.S. Cl. .................. 398/3; 398/79; 398/83
(58) Field of Classification Search .......... 398/3–5, 398/57–59, 14, 34, 79, 83
See application file for complete search history.

(56) References Cited

U.S. PATENT DOCUMENTS

| | | | |
|---|---|---|---|
| 5,101,290 A * | 3/1992 | Eng et al. ............ | 398/51 |
| 5,680,490 A | 10/1997 | Cohen et al. | |
| 5,717,795 A | 2/1998 | Sharma et al. | |
| 5,943,148 A * | 8/1999 | Hamel et al. ......... | 398/83 |
| 6,728,485 B2 * | 4/2004 | Pfeiffer ............... | 398/74 |
| 6,785,472 B1 * | 8/2004 | Adams et al. ......... | 398/79 |
| 7,158,722 B1 * | 1/2007 | Frigo et al. ........... | 398/30 |
| 2001/0028488 A1* | 10/2001 | Kim et al. ............. | 359/124 |
| 2002/0105692 A1* | 8/2002 | Lauder et al. ........ | 359/124 |
| 2002/0149817 A1 | 10/2002 | Kiliccote et al. ..... | 359/119 |
| 2002/0154357 A1* | 10/2002 | Ozveren et al. ...... | 359/124 |

FOREIGN PATENT DOCUMENTS

| | | |
|---|---|---|
| EP | 0 697775 A2 | 2/1996 |
| EP | 859 480 | 8/1998 |
| EP | 1 061 684 | 12/2000 |
| EP | 1 063 803 | 12/2000 |
| EP | 1 063 803 A1 | 12/2000 |
| EP | 1 128 585 A2 | 8/2001 |
| JP | 07-177169 | 7/1995 |
| JP | 08-018538 | 1/1996 |
| JP | 08-051401 | 2/1996 |
| JP | 09-105833 | 4/1997 |
| JP | 10-242917 | 9/1998 |
| JP | 2001-036479 | 2/2001 |
| JP | 2001-036557 | 2/2001 |

(Continued)

OTHER PUBLICATIONS

Wahlin, F., Form PCT/ISA/201, International—Type Search Report for SE 01/00536 completed on Dec. 20, 2001 (4 pages).

(Continued)

*Primary Examiner*—Dzung D Tran
(74) *Attorney, Agent, or Firm*—Nixon & Vanderhye P.C.

(57) ABSTRACT

The present invention relates to a system for optical transmission of information over a multiplexed logical ring structure comprising a number of nodes, of which at least one is a master node, as stated in the independent claim 1. Said ring structure is a combination of a number of logical optical rings on the same physical fiber ring. Possible embodiments are disclosed in the dependent claims.

32 Claims, 9 Drawing Sheets

FOREIGN PATENT DOCUMENTS

| | | |
|---|---|---|
| JP | 2001-053687 | 2/2001 |
| JP | 2001-077793 | 3/2001 |
| WO | WO 99/14879 | 3/1999 |

OTHER PUBLICATIONS

The Pan American Cable System by Patrick R. Trischitta, et al.; IEEE Communications Magazine; Dec. 1997; pp. 134-190.

Jeong-Hun Shin et al., "Demonstration of self-healing and automatic retrieval in two-fibre bi-directional WDM ring network", Electronics Letters, vol. 37, No. 3, Feb. 1, 2001, pp. 188-190.

Translation of Japanese official action, Oct. 20, 2009 in corresponding Japanese patent application No. 584515.

Japanese Office Action and Translation of Office Action mailed Jun. 22, 2010 in corresponding Japanese Application No. 584515/2002.

* cited by examiner

OPTICAL CWDM-SYSTEM

TECHNICAL FIELD

The present invention relates to optical communication systems and a method in such a system.

BACKGROUND OF THE INVENTION

The invention is based on a technique called Wavelength-Division-Multiplexing (WDM). Two different types of WDM-systems exist. The first type is called Dense-Wavelength-Division-Multiplexing (DWDM). In a DWDM system the laser chip in the laser diode of the transmitter is cooled by a peltier-element to keep the laser light source stable at a certain wavelength. The different wavelengths of different light sources at the transmitters of the DWDM system are closely spaced to each, typically between 50 GHz to 200 GHZ. DWDM systems are usually used in combination with optical amplifiers.

The second WDM system existing is Coarse-Wavelength-Division-Multiplexing (CWDM). CWDM is a technique that uses uncooled laser diodes for generating the different channels. The wavelength of such diodes is allowed to drift with temperature, which is compatible with the use of cheaper broadband filters. The complexity of the mechanical construction of the laser diode is reduced in comparison to laser diodes used in DWDM-systems.

One possible structure for an optical transmission system is at least one fibre pair ring. Said ring includes a number of nodes. Some nodes connect different rings with each other. Said nodes are called master nodes. Other nodes connect different endpoints, comprising users or subscribers, to the optical transmission system. Said nodes are connected to access rings of the system.

Fibre is a rare material in the city core network and two techniques or, rather, systems for transmitting information from one node to another is used. One system is a ring structure comprising electrical Time-Division-Multiplexing (TDM) add/drop multiplexers and the other system is DWDM rings with a hubbed add/drop structure.

In a TDM add/drop multiplexer ring structure, all nodes in the access ring are sharing the capacity that is made available by the master node. The maximum capacity is defined by the line interfaces of the nodes and all nodes have to have the same line interface. All traffic that is transported on the ring is terminated in each node, thus each node communicates with its direct neighbour. The logical and physical traffic structure is a ring. Due to the ring structure it is possible to protect the system in the transport protocol by using a two fibre ring infrastructure. This type of structure is implemented in the SDH/SONET, DTM, DPT and RPR standards.

In a DWDM an add/drop multiplexer ring structure, each access node is connected via its own wavelength to the master in the ring. Thus, the traffic pattern is a star with the master as a hub. DWDM systems are used as transportation systems, but this star topology suits mostly with an Ethernet star structure. If the number of nodes is increased in the ring an amplifier has to be used to compensate the losses in the optical add/drop filters.

From European Patent Application EP 1 063 803 A1 is a CWDM optical ring network earlier known. A dual-ring, bi-directional optical fibre transmission system interconnects a series of add/drop nodes with a hub, such that multiple, widely spaced CWDM channels are established on each ring. At each node, an optical add/drop module (OADM) includes broadband filters, such as dielectric thin film filters. Said filters are arranged to (a) extract, for the purposes of a receiver, or (b) insert, for the purposes of a transmitter, information in one or more of the channels. The signals in the one or more channels are coupled to the OADM's by a standard optical transceiver, which performs modulation and demodulation. Even though the physical topology, or structure, of the network is a ring topology, the logical topology, even called virtual topology, is a star. This means that endpoints at each of the nodes communicate with other endpoints connected to the hub. If desired, the hub in this known system can be configured to allow for selected CWDM channel optical by-pass, thereby enabling a direct connection between a pair of add/drop nodes on the ring. This connection is characterised as a point-to-point link. This means that only two points could be directly connected to each other for each wavelength used in the network system at a time. This causes a limitation in the possibility to increase the number of nodes and the capacity of this known network.

BRIEF DESCRIPTION OF THE INVENTION

A general problem of broadband access systems is to increase the number of access nodes. The nodes of the TDM ring share the available bandwidth. If a minimum bandwidth per node has to be guaranteed, the maximum number of nodes per ring is limited. Point-to-point WDM systems are expensive and hubbed WDM system are not optimised for TDM protocols. They are instead optimized to packet switched networks. In other words, a problem faced by many operators today is to upgrade or migrate their existing infrastructure to modern networks.

The basic idea is to increase the transmission capacity per fibre by combining light channels of different wavelengths on one fibre. A coarse WDM optical add/drop network structure optimised for logical TDM ring topologys is suggested.

In more detail, the present invention relates to a system for optical transmission of information over a multiplexed logical ring structure comprising a number of nodes, as stated in the independent claim 1. Said ring structure is a combination of a number of logical optical rings, each at a specific wavelength, on the same physical fibre ring. Possible embodiments are disclosed in the dependent claims. For an example, one node or a number of nodes may be master nodes.

One advantage of the present invention is that it provides a protocol transparent solution and therefore is easy to apply to an existing system. Wavelength channels, like virtual fibre pairs, can be added one after the other without interrupting the existing traffic.

Further one advantage of the present invention is that different wavelength channels do not interfere with adjacent channels and, thus, do not exchange information.

Furthermore, one advantage is that the proposed system offers a major cost reduction compared to DWDM systems.

Yet another advantage is that the wavelengths are no longer dedicated to specific access node. The same wavelength is added and dropped several times throughout the network generating logical wavelength rings.

Another advantage is that logical rings need fewer wavelengths to connect a higher number of access nodes. For instance, only two wavelengths are necessary to connect five access co-locations.

Another advantage is that a number of expensive router interfaces at the Master node is reduced and by this the total cost of the solution.

Finally, by deploying logical wavelength rings the multicast functionality is fully exploited.

DETAILED DESCRIPTION OF THE INVENTION

Figure 1:
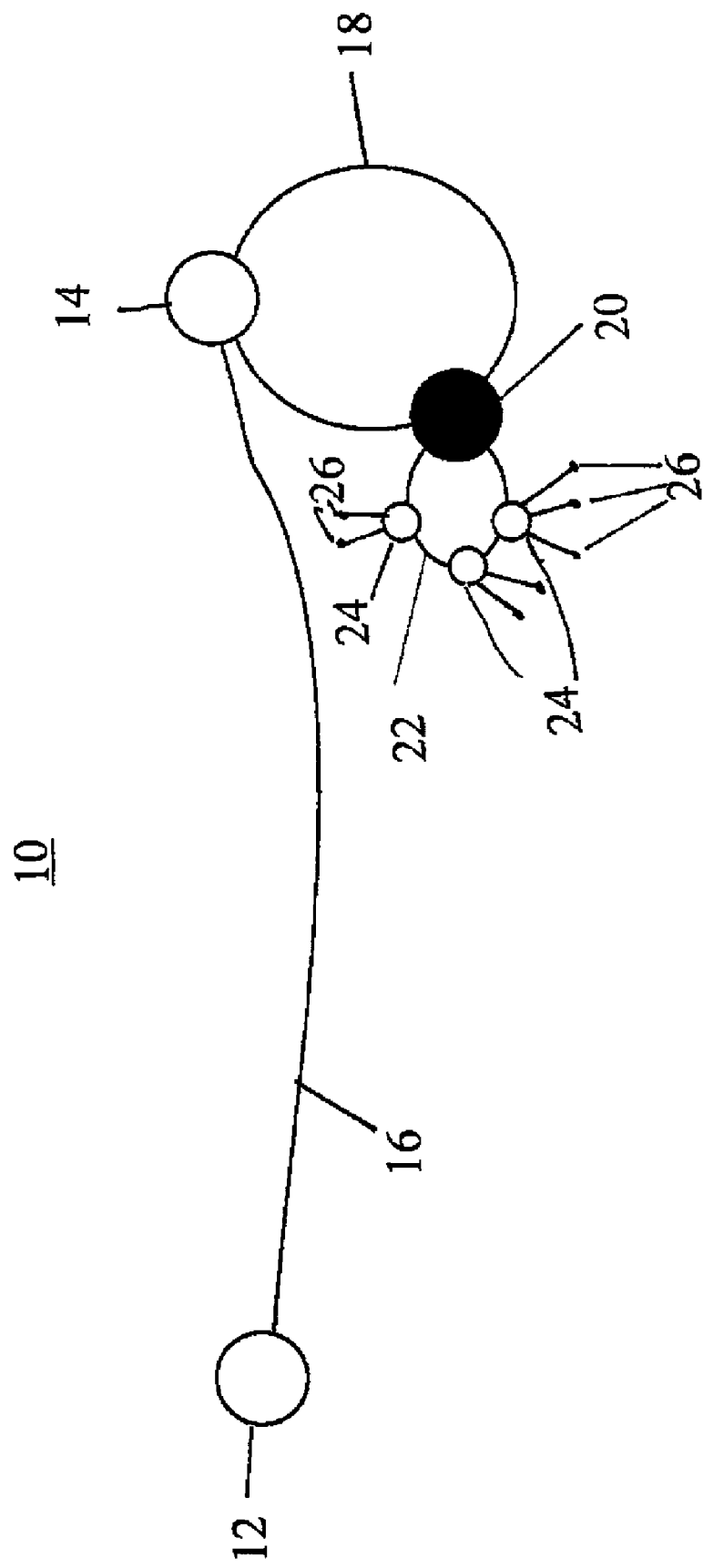
FIG. 1 is a schematic illustration of a system for optical transmission of information.

FIG. 1 is a schematic illustration of a system for optical transmission of information, wherein said system comprises an optical fibre network 10. Said network 10 is arranged between two geographic sites 12, 14, e.g. Gothenburg and Stockholm. This long distance part of the system is called a core network 16, sometimes even called a backbone. The core network 16 includes a trunk of optical fibres for the transmission of information. From the core network 16 is the information conducted into a metropolitan access network (MAN) ring 18. At least one master node 20 is connected to said MAN. The master node is a common node for the MAN and an access ring 22. The access ring comprises an optical fibre pair (not shown). Connected to said fibre pair is a series of OADM nodes 24. Subscriber/client devices for receiving and/or transmitting information are connected to each OADM-node via subscriber/client connections 26.

Figure 2:
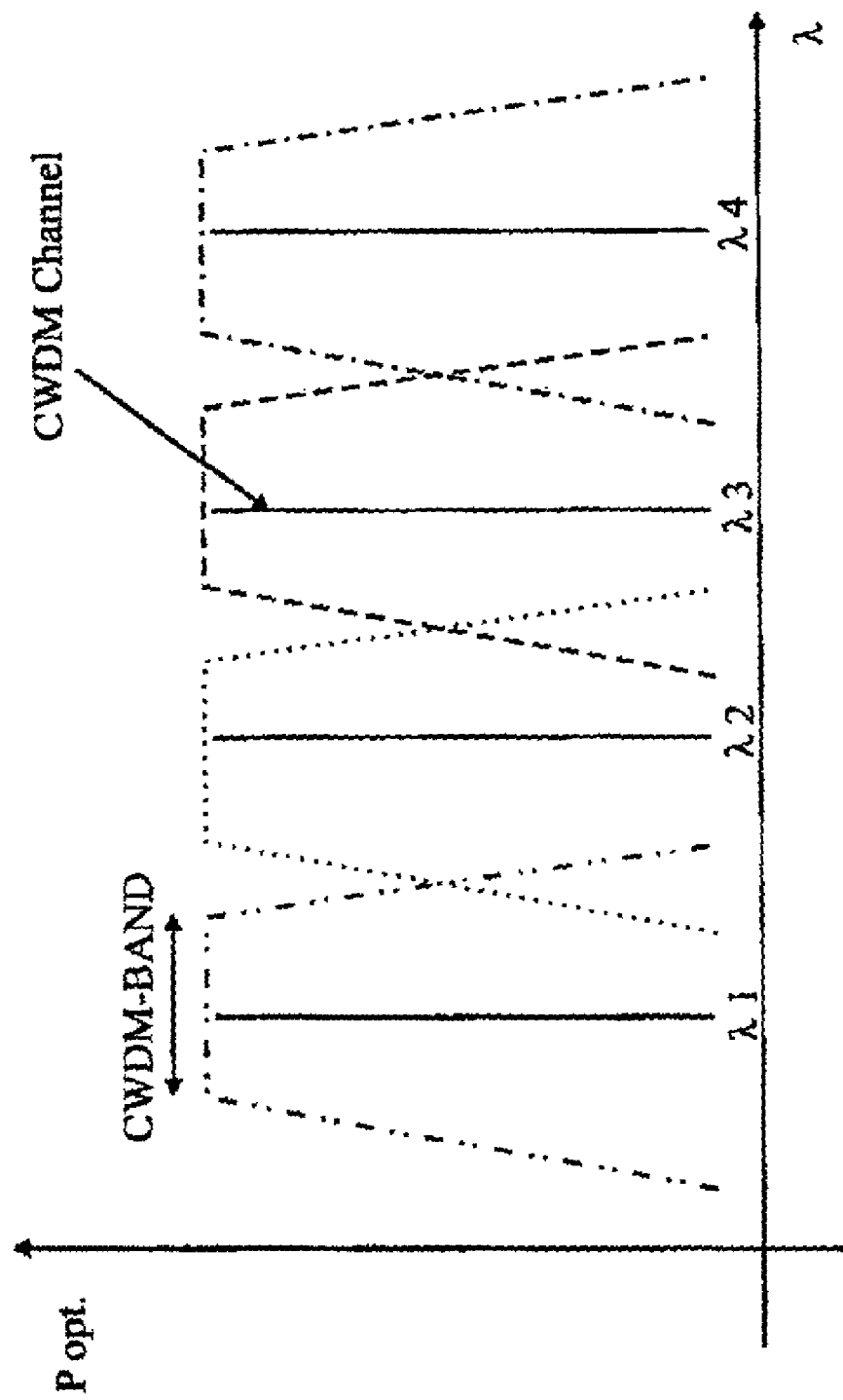
FIG. 2 shows a spectrum diagram for a CWDM-system.

FIG. 2 shows a diagram wherein the abscissa is the optical wavelength, $\lambda$, and the ordinate is the optical effect, $P_{opt}$. In a transmission system based on the CWDM (coarse-wavelength-division-multiplexing) technology a number of optical transmission bands are spread in a band of the optical spectrum. FIG. 2 shows four optical transmission bands, each one including one channel, $\lambda_n$ (n=1, 2, 3, 4, . . . ). Different wavelength channels are separated for not interfering with each other. A typical channel spacing is 20 nm (corresponding to 2400 GHz in the frequency band). CWDM is a technique that uses uncooled laser diodes for generating the different channels. The channel wavelength can change with the temperature of the laser diode, but as the original wavelength is centred in the band and the spacing is enough, the drifting of the laser diode will not cause any problem. This will reduce the price of the system, but also reduce the number of possible channels per wavelength interval.

Figure 3:
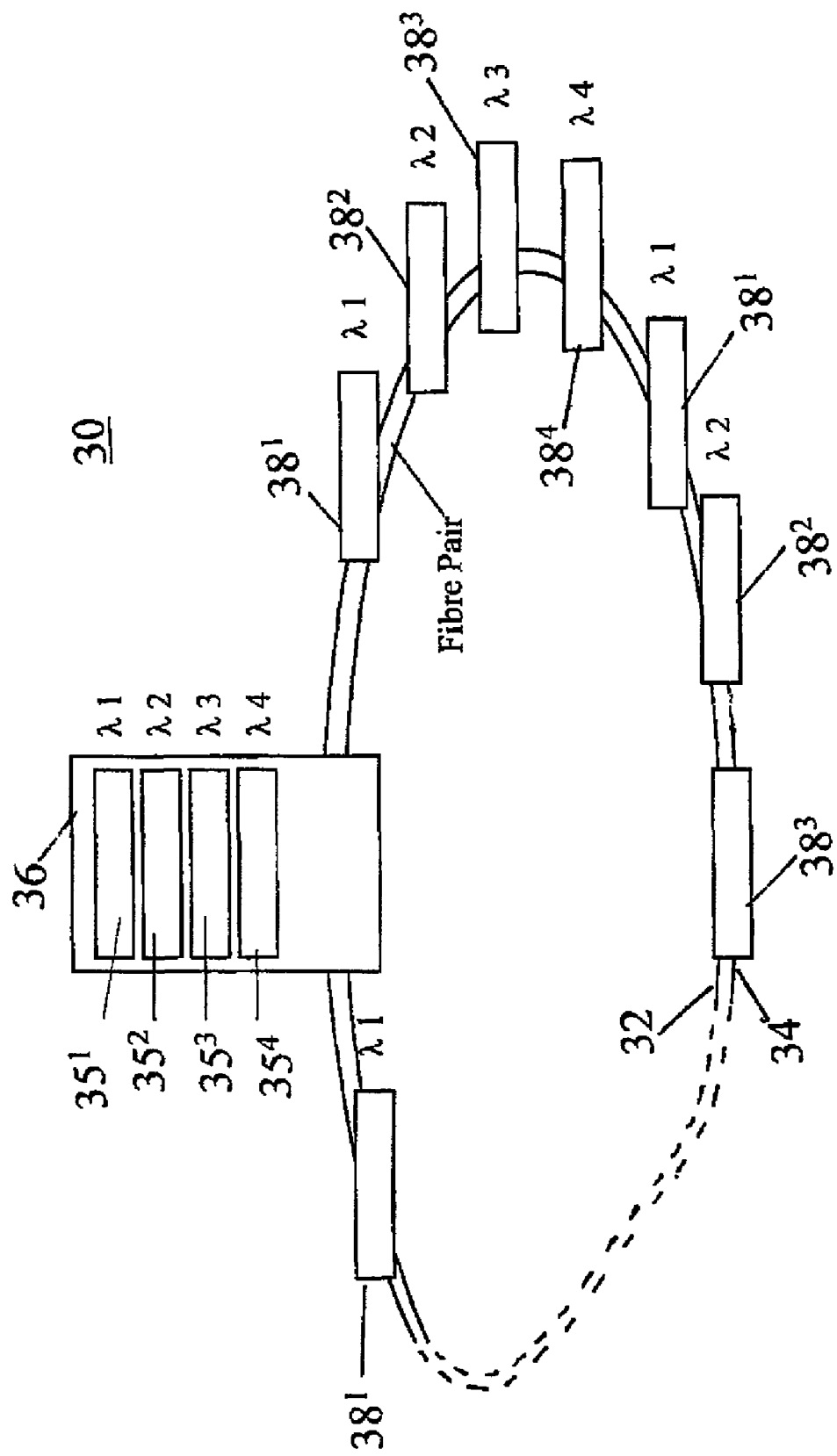
FIG. 3 is a schematic illustration of a multiplexed ring structure according to the present invention.

FIG. 3 is a schematic illustration of a multiplexed ring structure embodiment of the invention. A physical access ring 30 comprises two optical fibres 32, 34 constituting a fibre pair. A number of nodes 38, of which one is a master node 36, are connected to said ring and fibre pair. The master node 36 connects the access ring to a metropolitan area network, MAN. However, it is not necessary that the ring has to comprise a master node. As shown in FIG. 1, all nodes are physically connected to the fibre pair, but logically the nodes 38 are connected to different logical wavelength rings/channels $\lambda_n$ (n=1, 2, 3, 4, . . . ). This means that physically adjacent OADM-nodes, in other words neighbour nodes 38, do not need to be logical neighbours $38^1$; $38^2$; $38^3$; $38^4$. Nodes $38^n$ is logical nodes and belongs to the same logical ring $\lambda_n$. A master node 36 is characterised as a common point for all logical rings and it therefore allows transfer of information from one logical ring to another. The master node comprises a number of master node elements $35^n$ (n=1, 2, 3, 4, . . . ), each one corresponding to a logical ring.

Figure 4:
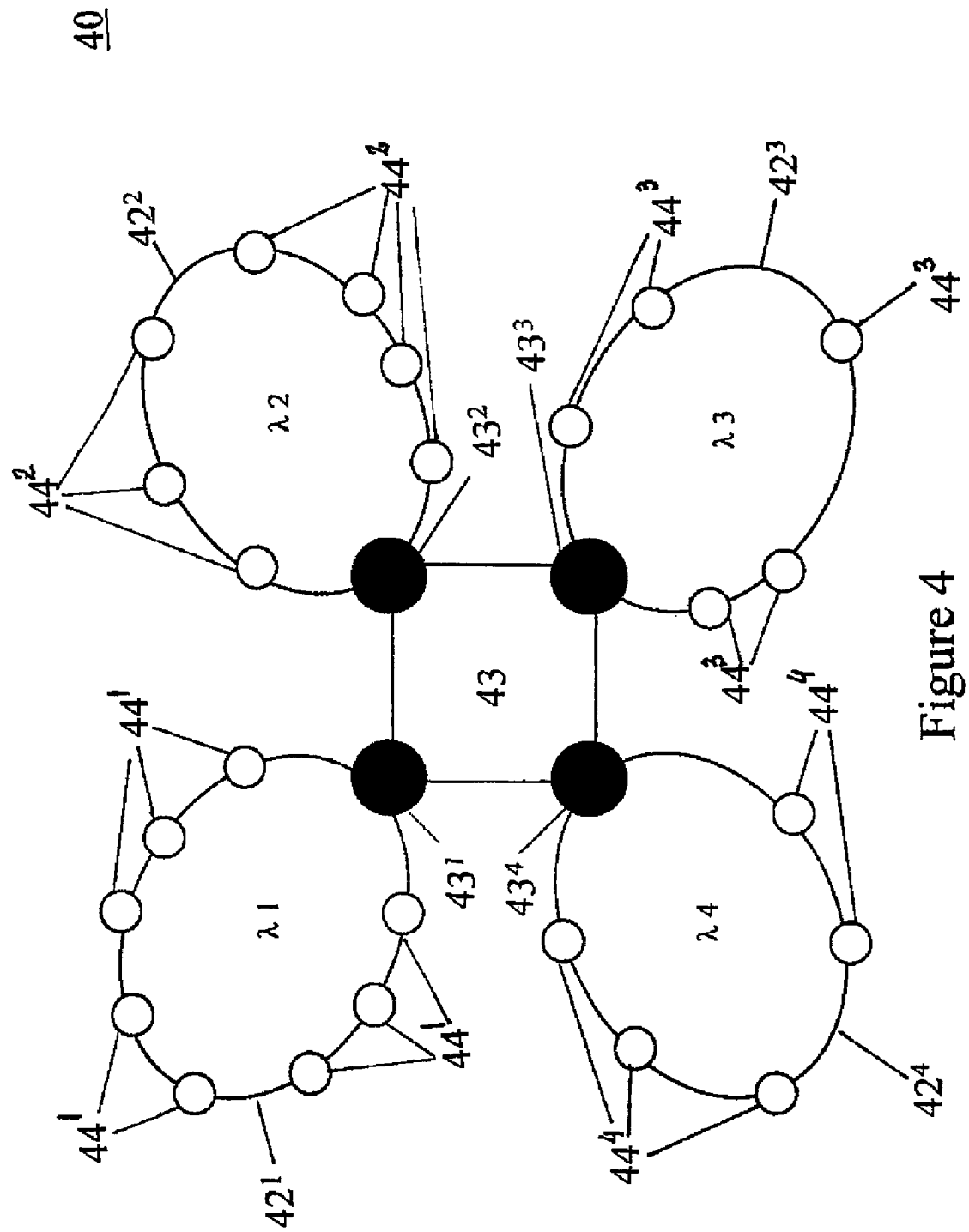
FIG. 4 is an illustration of a logical ring structure according to the present invention.

FIG. 4 is an illustration of a logical ring structure 40 according to the present invention. The invention provides a multiplexed ring structure 40 combining a number of logical optical rings $42^n$ (n=1, 2, 3, 4, . . ) on the same physical fibre ring comprising a fibre pair (32, 34 in FIG. 3). Each logical ring $42^n$ operates on a different wavelength band $\lambda_n$. The spacing between each band is such as there is no cross talk between the logical rings $42^n$. Each ring is constituted by a series of OADM nodes 44, logical neighbours, such as one wavelength is dropped and/or added, while the other wavelengths go through with minimum cross talk. Each node 44 retrieves all traffic at the wavelength $\lambda_n$ defining the logical ring $42^n$ it belongs to. Depending on the situation, the traffic then can be either terminated or fully regenerated and/or processed and then sent back into the logical ring. A Master node 43 intersects all logical rings and allows to transfer traffic from one ring to the other, by converting the wavelength. It acts as well as a gateway between the multiplexed logical rings and a larger core system, for instance a Wide Area Network (WAN) or a Metropolitan Area Network (MAN). One Master node is created by cascading a number of nodes $43^n$ (n=1, 2, 3, 4, . . . ), each belonging to one of the rings intersecting the Master node. Each Master node element feeds one wavelength in the next Master node element, which add a new wavelength, until all the desired wavelengths are multiplexed.

The difference between this and other network structure is following. Compared to only TDM rings the maximum number of access nodes is now increased by a multiple with the number of wavelength used in the network. Each wavelength access node is communicating with the neighbour with the same wavelength, not with the physical/geographical neighbour. Compared to WDM hubbed rings the logical traffic pattern flow is still existing. Ring protocol like SDH/SONET, DTM, DPT and RPR are based on the assumption that the logical ring infrastructure is available. Even Gigabit Ethernet networks can be configured as rings with the help of modem switches and routers. "Hubbed" wavelength systems do not comply with this assumption as they represent a logical star topology.

The concept of logical rings gives the freesom to deploy new technologies alongside the existing ones, with minimal changes to the existing ones, with minimal changes to the infrastructure, examples:

Add a DTM ring (DTM is a trademark of Cisco System INC) to an existing SDH/SONET metro network.

Add a second DPT ring (DPT is a trademark of Dynarc INC) to an existing DPT ring.

Divide a Gigabite Ethernet ring into multiple rings.

Feed distributed HFC coax islands.

Figure 5:
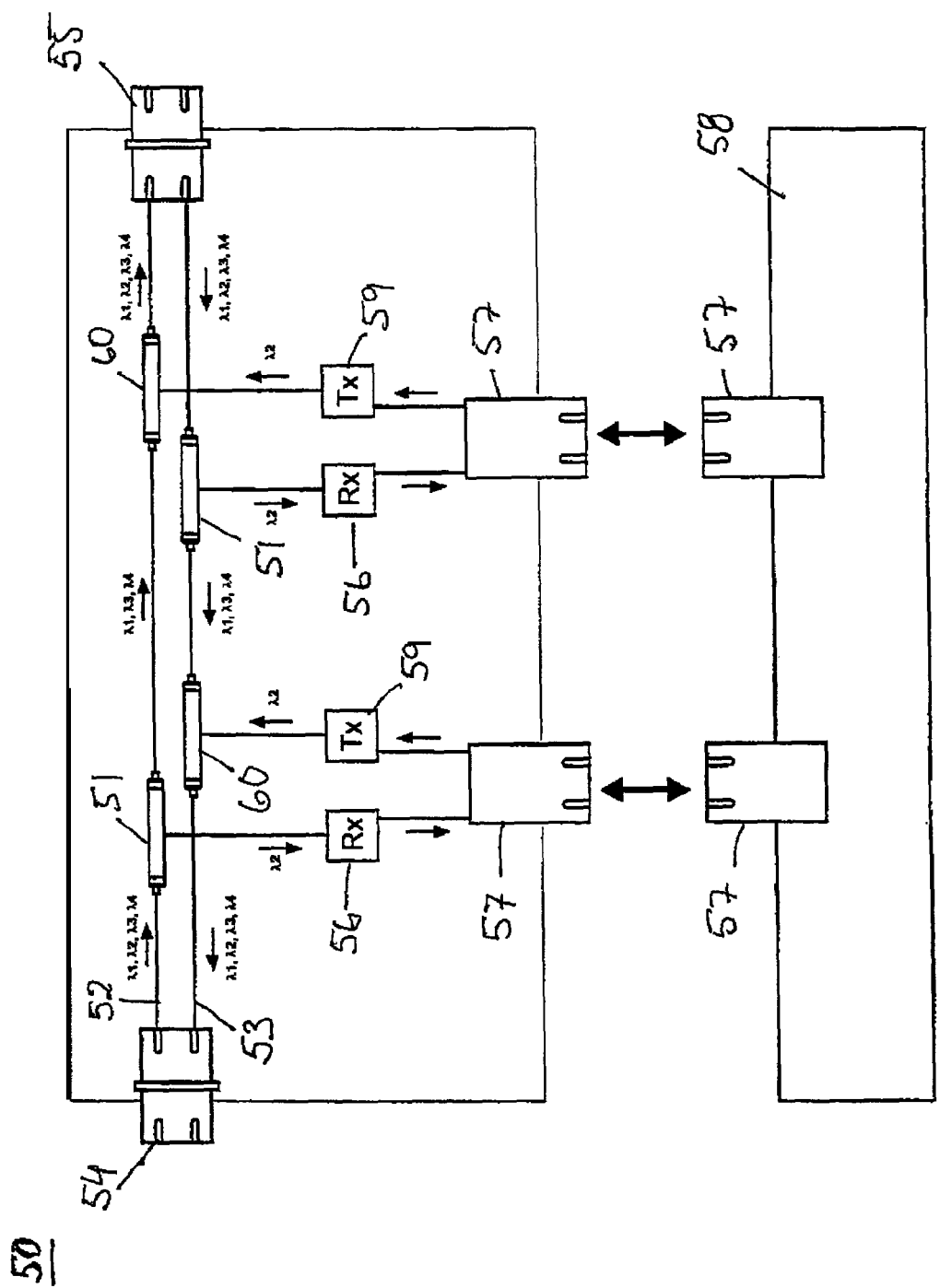
FIG. 5 is a block diagram illustrating an optical add/drop multiplexer (OADM) in a node of the present invention.

FIG. 5 is a block diagram illustrating an optical add/drop multiplexer (OADM) 50 in a node of the present invention. The multiplexer is connected to the fibre pair, 52 and 53, of the access ring via the contact interfaces, east 54 and west 55. Information is transported in both directions on the pair. The function of the OADM is following. The present node drops $\lambda_2$-channel information by use of a drop filter 51. Said information is received by use of a CWDM receiver 56 that forwards the information to a low cost transceiver 57. The transceiver is an optical connection or an electric interface to a processing unit 58 that comprises an information processor. The processed information is returned via the low cost transceiver to a CWDM transmitter 59 that transmits the processed information on to the $\lambda_2$ channel. The transmitter is connected to an add-filter 60 that adds the information onto the same fibre.

Figure 6:
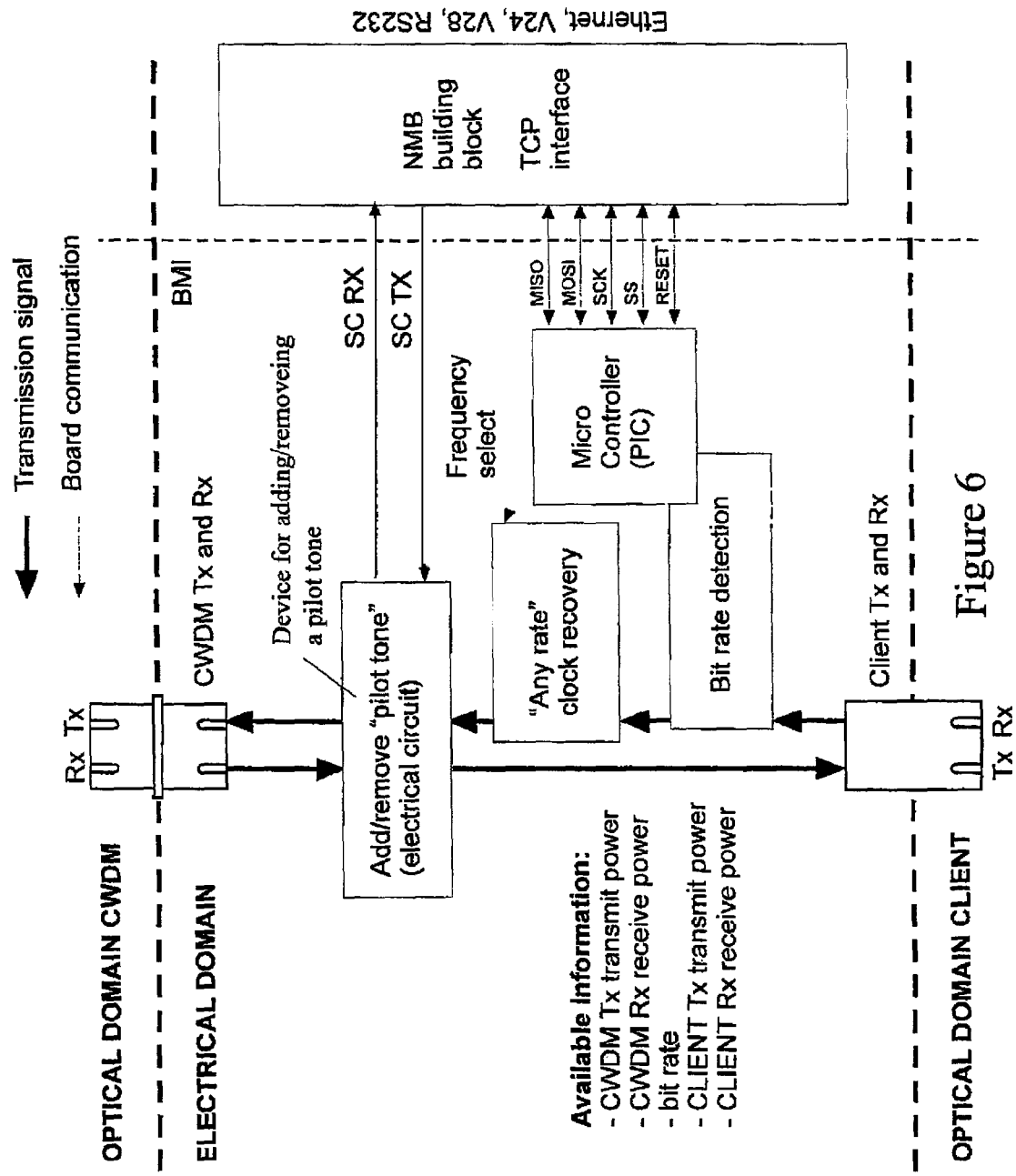
FIG. 6 illustrates the data flow in the electrical domain of a CWDM-ring element with Network Management Channel.

FIG. 6 illustrates the data flow in the electrical domain of a CWDM-ring element with Network Management Channel, which is an embodiment of the present invention. A Network Management Channel can be modulated as an overtone in the electrical frequency domain on the transmission signal channel. By doing this, information from one node can be distributed in the system. Said CWDM-ring element comprises a device for adding/removing the pilot tone/overtone. Distributed information can be for example link losses between nodes or information collected at each node from other equipment.

Figure 7:
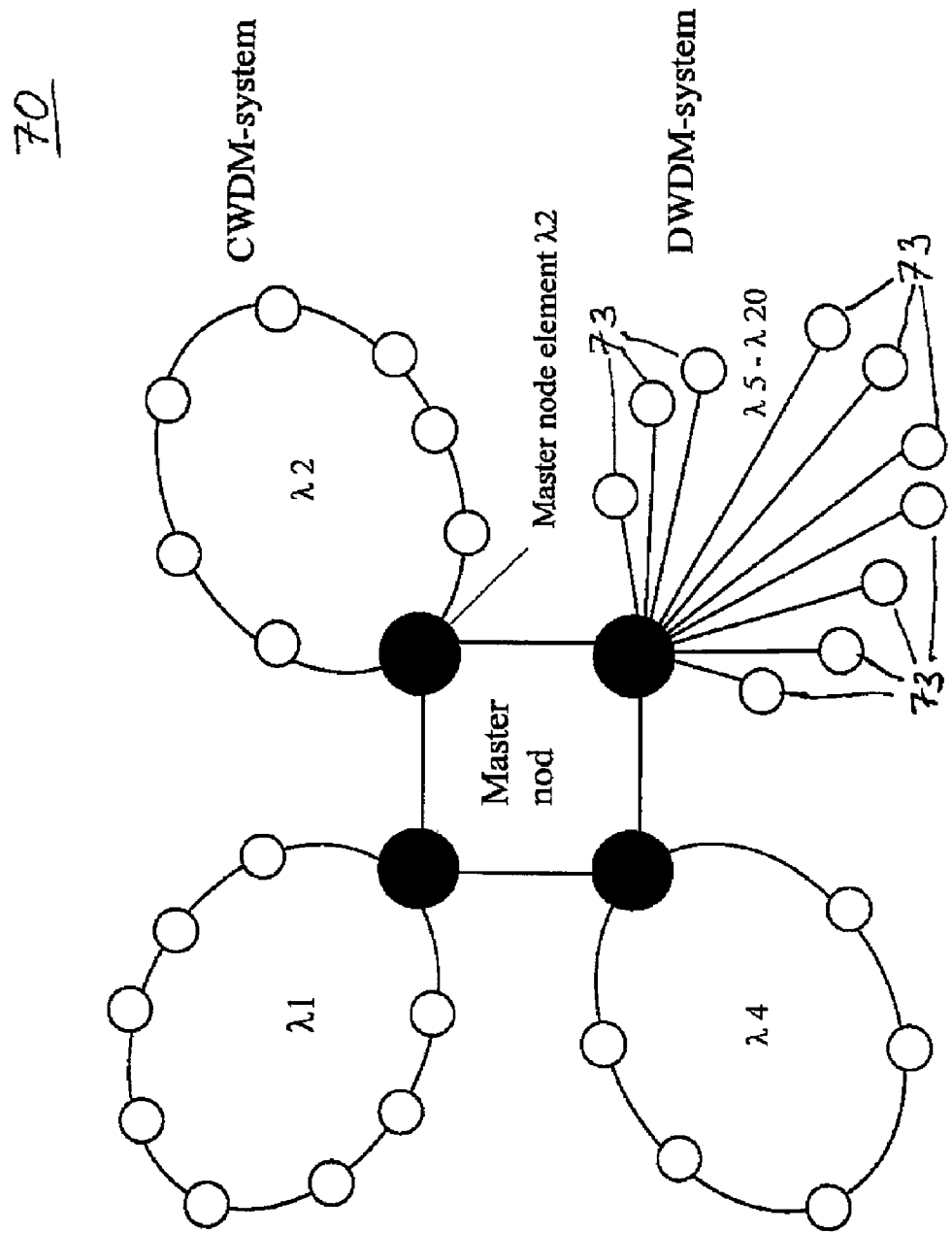
FIG. 7 is an illustration of a logical ring structure of a Hybrid CWDM-DWDM system, which is further one embodiment of the present invention.

FIG. 7 is an illustration of a logical ring structure of a Hybrid CWDM-DWDM system 70, which is further one embodiment of the present invention. This structure is similar to the logical ring structure in FIG. 4, and therefore are corresponding reference numbers for equivalent details used. Due the fact that CWDM channels use a wavelength band with a bandwidth of around 13 nm, it is possible to build a hybrid system. One of the channel bands is used for a multi-channel DWDM system, in this case 16 ($\lambda_5$-$\lambda_{20}$). The add/drop configuration of the DWDM system then would be a hubbed configuration, also called star topology/structure, and thus some nodes 73 with an extraordinary need of broadband access could be supplied by this system. The DWDM system has no logical ring structure and acts as point-to-point structure from the master to each node 73. This will constitute a hybrid system that can have a spectrum diagram illustrated in FIG. 8.

Figure 8:
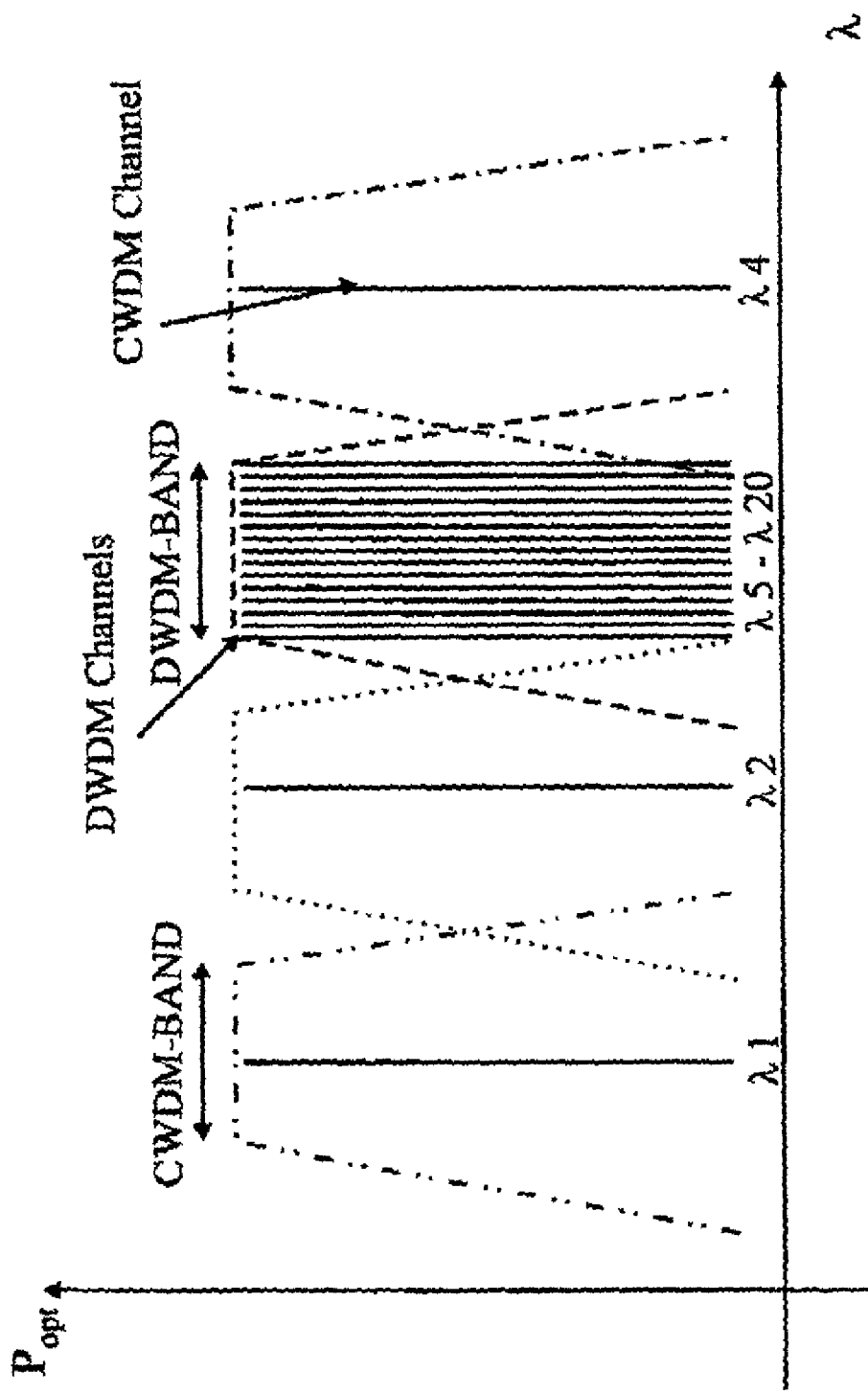
FIG. 8 is a spectrum diagram of a transmission system based on the Hybrid CWDM-DWDM system technology according to another embodiment of the present invention.

FIG. 8 is a similar spectrum diagram as earlier illustrated in FIG. 1, wherein the abscissa is the optical wavelength, $\lambda$, and the ordinate is the optical effect, $P_{opt}$. The transmission system based on the Hybrid CWDM-DWDM system technology has a number of optical transmission bands that are spread in a band of the optical spectrum. The third CWDM-channel $\lambda_3$ replaced by a number of DWDM-channels $\lambda_5$-$\lambda_{20}$.

Figure 9:
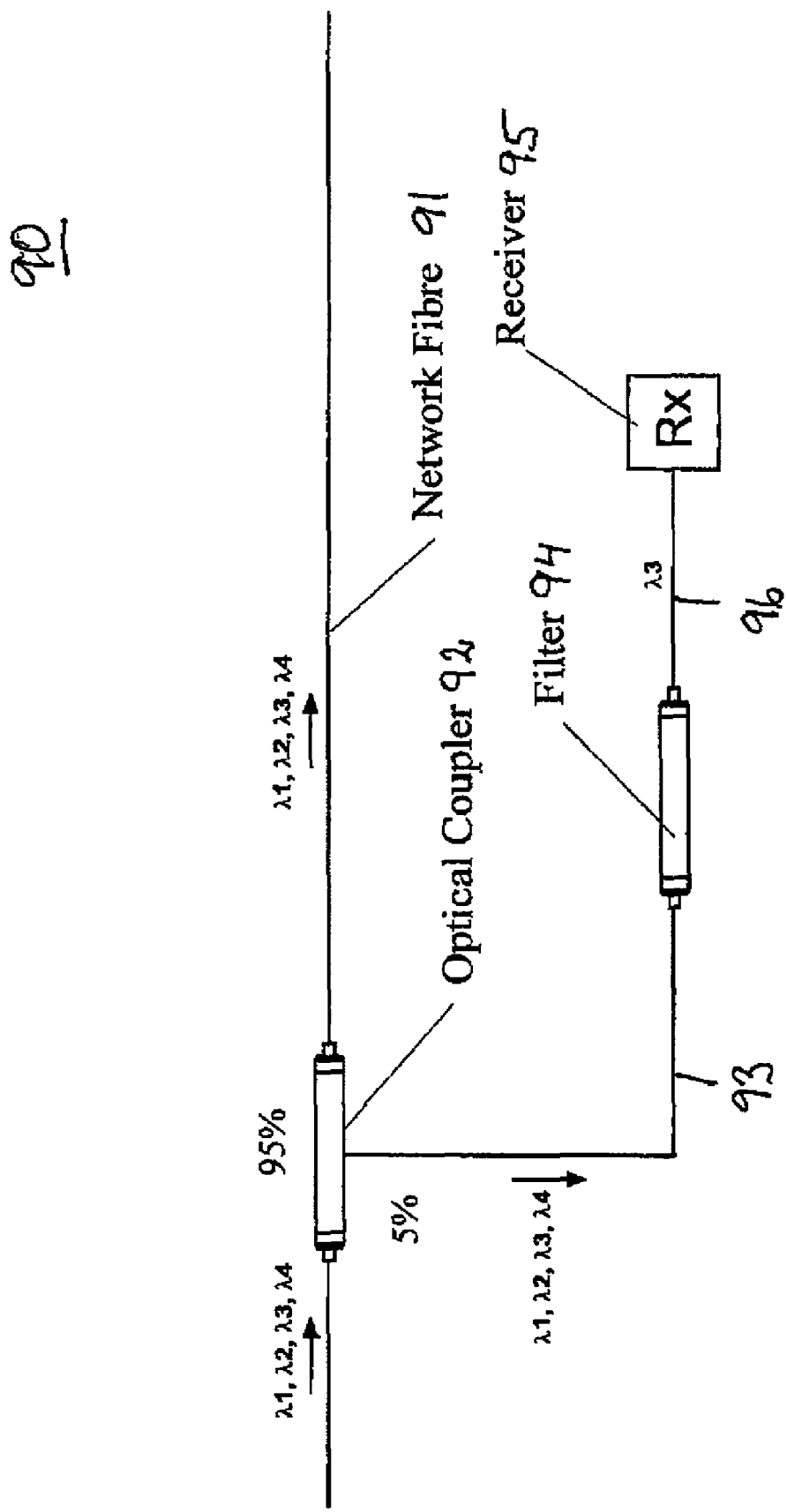
FIG. 9 shows a broadcast drop node design according to an embodiment of the present invention.

FIG. 9 shows a broadcast drop node design 90. Such a design could be implemented in the CWDM ring. For example, it is of interest to broadcast cable-TV via optical signals on channels $\lambda_1$-$\lambda_4$. In this case, 5% of the optical effect of all the signals on the different channels $\lambda_1$-$\lambda_4$ is divided by use of an optical coupler 92 connected to a network fibre 91. The rest of the 95% of the optical effect of the signals continues through the network fibre 91. A filter 94 is connected to the optical coupler 92 by use of a fibre 93 and the dropped signals is conducted to said filter. The filter extracts a predetermined CATV-signal (in this case $\lambda_3$) and stops the remaining signals ($\lambda_1$-$\lambda_2$ and $\lambda_4$) to pass through the filter. The predetermined CATV-signal is conducted via a fibre 96 to a connected receiver $R_x$ 95, in which the optical signal can be converted to the electric domain. In the next broadcast nodes a similar procedure is performed. The only difference is how much of the optical effect is divided and which channel signal that is allowed to pass said filter.

The advantage by using this type of system is that traffic (e.g. cable-TV) is on one wavelength and bi-directional traffic (e.g. voice, data, . . . ) is on another wavelength. Different end-equipment could be used together with different wavelength.

The present invention is not limited to the above-described preferred embodiments. Various alternatives, modifications and equivalents may be used. Therefore, the above embodiments should not be taken as limiting the scope of the invention, which is defined by the appended claims.

The invention claimed is:

1. A system for optical transmission of information over a multiplexed logical ring structure, comprising a number of nodes, wherein said multiplexed logical ring structure is a combination of a number of logical optical rings, each at a specific wavelength, on the same physical fibre ring, wherein each logical optical ring links a number of optical add/drop multiplexer (OADM) nodes, such that the wavelength defining said logical optical ring is added or dropped, while the other wavelengths go through with minimum cross talk; and
wherein each of the OADM nodes is configured to drop information associated with the wavelength defining the logical optical ring from the physical fibre ring, actively process the information in an OADM node information processor, and transmit by an OADM node optical transmitter including a laser diode to add the processed information and other information if available to the physical fibre ring at the same wavelength as the OADM node receives information.

2. The system according to claim 1, wherein said physical fibre ring is composed by two fibres to a fibre pair.

3. The system according to claim 1, wherein each logical optical ring is configured to operate on a different wavelength, each logical optical ring comprises and supports at least two nodes, and each node exchanges information with its direct neighbours on the said logical optical ring.

4. The system according to claim 1, wherein the spacing between each adjacent pair of wavelengths is such that there is no cross talk between the logical optical rings.

5. The system according to claim 1, wherein each node is configured to receive all traffic at the wavelength defining the logical optical ring it belongs to.

6. The system according to claim 1, wherein at least one of the nodes is a master node that is a common point for all logical optical rings, and each said master node intersects all logical optical rings and allows transfer of traffic from one logical ring to another by converting the wavelength.

7. The system according to claim 1, wherein said system comprises at least one CWDM-ring including at least one Network Management Channel, wherein the Network Management Channel is multiplexed electrically in the frequency domain before being transmitted optically on fibres.

8. The system according to claim 1, wherein said system is a CWDM-system wherein at least one of the channel bands is used for a multi-channel DWDM system.

9. The system according to claim 1, wherein said system comprises at least one CWDM-ring having at least one broadcast drop node.

10. The system according to claim 1, wherein said system is a CWDM-system.

11. The system according to claim 1, wherein each of the OADM nodes in one logical optical ring includes an optical receiver for receiving optical information at just the wavelength defining the one logical optical ring, and wherein each OADM node is configured to only drop one wavelength.

12. The system according to claim 1, wherein each of the OADM nodes is configured to drop information associated with the wavelength defining the logical optical ring from the physical fibre ring and to process in the information processor and terminate the dropped information.

13. The system according to claim 12, wherein each OADM node is configured to retrieve all information at the wavelength defining the logical optical ring including that OADM node.

14. A method for optical transmission of information over a multiplexed logical ring structure comprising a number of nodes, the method comprising the step of combining a number of logical optical rings, each at a specific wavelength, on the same physical fibre ring, wherein each logical ring links a number of optical add/drop multiplexer (OADM) nodes, such that the wavelength defining said ring is added or dropped, while the other wavelengths go through with minimum cross talk; and wherein each of the OADM nodes drops information associated with the wavelength defining the logical optical ring from the physical fibre ring, processes the information in an OADM node information processor, and transmits by an OADM node optical transmitter including a laser diode to add the processed information other information if available to the physical fibre ring at the same wavelength as the OADM node receives information.

15. A multiplexed ring structure for optical transmission of information, said multiplexed ring structure comprising:

a plurality of logical optical rings on a physical fibre ring, each of the plurality of logical optical rings operating at a specific wavelength; and wherein each of the plurality of logical optical rings links a plurality of optical add/drop multiplexer (OADM) nodes, each of the OADM nodes operating such that the wavelength defining the logical optical ring is at least one of added or dropped, while the other wavelengths go through with minimum cross talk; and wherein each of the OADM nodes is configured to drop information associated with the wavelength defining the logical optical ring from the physical fibre ring, actively process the information in an OADM node information processor, and transmit by an OADM node optical transmitter including a laser diode to add the processed information and other information if available to the physical fibre ring at the same wavelength as the OADM node receives information.

16. The multiplexed ring structure of claim 15, wherein each OADM node retrieves all traffic at the wavelength defining the logical optical ring to which it belongs.

17. The multiplexed ring structure of claim 15 further comprising:

a master node intersecting the plurality of logical optical rings, the master node configured to convert a wavelength of a first logical optical ring to a wavelength of a second logical optical ring to allow transfer of traffic from the first logical optical ring to the second logical optical ring.

18. The multiplexed ring structure of claim 15, wherein each logical optical ring is configured to operate on a different wavelength.

19. The multiplexed ring structure of claim 15, wherein a spacing between each adjacent pair of wavelengths is such that there is no cross talk between each of the logical optical rings.

20. The multiplexed ring structure of claim 15, wherein said multiplexed ring structure is CWDM-based.

21. The multiplexed ring structure of claim 15, wherein each of the OADM nodes in one logical optical ring includes an optical receiver for receiving optical information at just the wavelength defining the one logical optical ring, and wherein each OADM node is configured to only drop one wavelength.

22. The multiplexed ring structure of claim 15, wherein each of the OADM nodes is configured to drop information associated with the wavelength defining the logical optical ring from the physical fibre ring and to process and terminate the dropped information.

23. The multiplexed ring structure of claim 22, wherein each OADM node is configured to retrieve all information at the wavelength defining the logical optical ring including that OADM node.

24. A method for optical transmission of information over a multiplexed logical ring structure including a number of nodes, the method comprising the steps of:

defining a plurality of logical optical rings on a physical fibre ring, each of the plurality of logical optical rings comprising a plurality of optical add/drop multiplexer (OADM) nodes;

operating each of the plurality of logical optical rings at a specific wavelength; and operating each of the OADM nodes such that a wavelength defining a logical optical ring of the plurality of logical optical rings is at least one of added or dropped, while the other wavelengths go through with minimum cross talk; and wherein each of the OADM nodes drops information associated with the wavelength defining the logical optical ring from the physical fibre ring, processes the information in an OADM node information processor, and transmits by an OADM node optical transmitter including a laser diode to add the processed information other information if available to the physical fibre ring at the same wavelength as the OADM node receives information.

25. The method of claim 24, further comprising:

retrieving, by each OADM node, all traffic at the wavelength defining the logical optical ring to which it belongs.

26. The method of claim 24, further comprising:

converting a wavelength of a first logical optical ring to a wavelength of a second logical optical ring to allow transfer of traffic from the first logical optical ring to the second logical optical ring.

27. The method of claim 24, wherein the step of operating each of the plurality of logical optical rings at a specific wavelength further comprises operating each logical optical ring on a different wavelength.

28. The method of claim 24, wherein a spacing between each adjacent pair of wavelengths is such that there is no cross talk between each of the logical optical rings.

29. The method of claim 24, wherein said multiplexed ring structure is CWDM-based.

30. The method of claim 24, wherein each of the OADM nodes in one logical optical ring uses an optical receiver for receiving optical information at just the wavelength defining the one logical optical ring, and wherein each OADM node only drops one wavelength.

31. The method of claim 24, wherein each of the OADM nodes drops information associated with the wavelength defining the logical optical ring from the physical fibre ring and processes and terminates the dropped information.

32. The method to claim 31, wherein each OADM node in a logical optical ring retrieves all information at the wavelength defining that logical optical ring, and wherein each OADM node only drops one wavelength.

* * * * *